United States Patent
Gohain et al.

(10) Patent No.: US 12,360,887 B2
(45) Date of Patent: Jul. 15, 2025

(54) TECHNIQUES FOR IMPROVING HOST WRITE PERFORMANCE DURING DATA FOLDING BY WRITING TO ANOTHER DIE

(71) Applicant: Micron Technology, Inc., Boise, ID (US)

(72) Inventors: Nitul Gohain, Karnataka (IN); Jameer Mulani, Karnataka (IN); Amiya Banerjee, Karnataka (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/437,076

(22) Filed: Feb. 8, 2024

(65) Prior Publication Data

US 2024/0281144 A1 Aug. 22, 2024

Related U.S. Application Data

(60) Provisional application No. 63/486,370, filed on Feb. 22, 2023.

(51) Int. Cl.
*G06F 12/02* (2006.01)
(52) U.S. Cl.
CPC .. *G06F 12/0246* (2013.01); *G06F 2212/7202* (2013.01)

(58) Field of Classification Search
CPC ......... G06F 12/0246; G06F 2212/7202; G06F 3/0659
See application file for complete search history.

(56) References Cited

U.S. PATENT DOCUMENTS

| | | | |
|---|---|---|---|
| 2011/0029719 A1* | 2/2011 | Yeh | G06F 12/0246 711/E12.001 |
| 2016/0188224 A1* | 6/2016 | Yin | G06F 3/0659 711/154 |
| 2020/0104074 A1* | 4/2020 | Brown | G06F 3/0653 |

* cited by examiner

*Primary Examiner* — Chie Yew
(74) *Attorney, Agent, or Firm* — Holland & Hart LLP

(57) ABSTRACT

Methods, systems, and devices for techniques for improving host write performance during data transferring (e.g., folding) are described. A memory system may determine to transfer first data from one or more source data blocks of the memory system to one or more destination data blocks, where the source data blocks and the destination data blocks are associated with one or more memory dies of a set of memory dies of the memory system. The memory system may also receive, from a host system, a command to write second data to a first memory die of the one or more memory dies, and write, concurrent with transferring the first data, the second data to a second memory die of the set of memory dies different than the one or more memory dies based on the transfer of the first data being associated with the first memory die.

20 Claims, 6 Drawing Sheets

TECHNIQUES FOR IMPROVING HOST WRITE PERFORMANCE DURING DATA FOLDING BY WRITING TO ANOTHER DIE

CROSS REFERENCE

The present application for patent claims priority to U.S. Patent Application No. 63/486,370 by Gohain et al., entitled "TECHNIQUES FOR IMPROVING HOST WRITE PERFORMANCE DURING DATA FOLDING," filed Feb. 22, 2023, which is assigned to the assignee hereof, and which is expressly incorporated by reference herein.

TECHNICAL FIELD

The following relates to one or more systems for memory, including techniques for improving host write performance during data folding.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
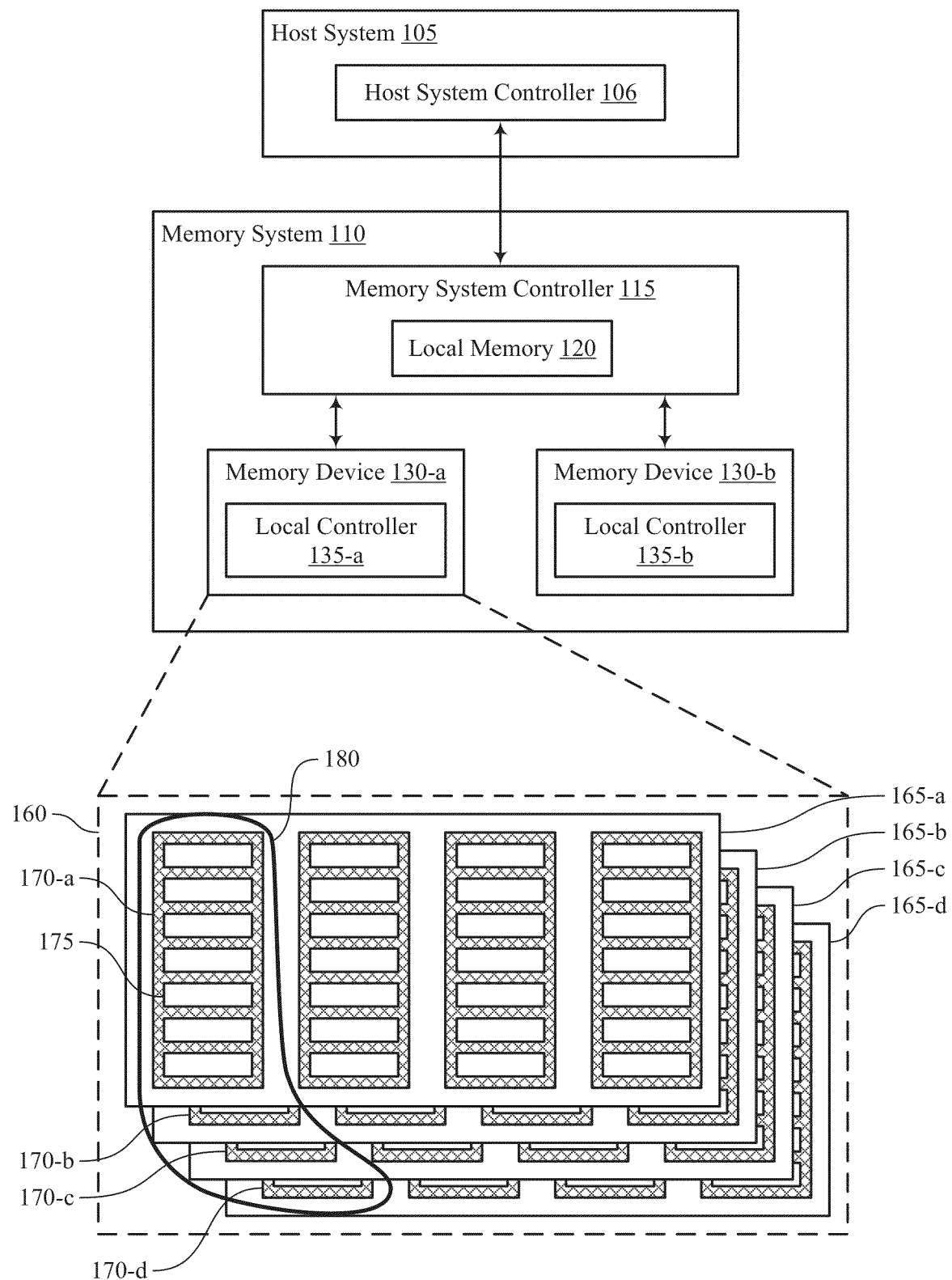
FIG. 1 illustrates an example of a system that supports techniques for improving host write performance during data folding in accordance with examples as disclosed herein.

A memory system may include dice for storing data, such as data received from a host system. In some examples, programming data to a respective die of the dice may involve receiving one or more commands to write data to one or more data blocks of the die, temporarily storing the data in a buffer, and writing the data to memory cells (e.g., single level cells (SLCs), multi-level cells (MLCs), tri-level cells (TLCs), or quad-level cells (QLCs)) of the data blocks according to the command. The memory system may subsequently transfer (e.g., fold) the data, for example, to QLCs of other data blocks of the memory system. In some examples, writing data to lower storage density memory cells (e.g., SLCs, MLCs, or TLCs) may be faster than folding data to higher storage density memory cells (e.g., QLCs). Thus, by transferring (e.g., folding) data from lower storage density memory cells to high storage density memory cells, the memory system may free up one or more data blocks that include lower storage density memory cells for further host writes (e.g., write operations performed in response to commands received from a host system) or other operation while consolidating information within data blocks that include higher storage density memory cells to improve storage efficiency.

In some cases, a host system coupled with the memory system may perform an access operation on (e.g., write data to) one or more data blocks of a die while the memory system is performing transferring (e.g., folding) operations with one or more dies including the die (e.g., transferring data from a set of source data blocks that includes the one or more data blocks). However, the memory system may not support performing a host-initiated access operation (e.g., host writes) concurrent with a transferring (e.g., folding) operation on a same die, and thus the die may not be able to accommodate the host access operation until after transferring (e.g., folding) is complete or unless the transferring (e.g., folding) operation is temporarily delayed (e.g., suspended, paused). However, delaying host access operations may reduce a host write performance, whereas delaying transferring (e.g., folding) operations may reduce a quantity of data blocks (e.g., lower storage density data blocks) that are freed and available to accommodate additional host data. Further, host data intended to be written to the data block of the die occupied with transferring (e.g., folding) may, in such situations, be held in a buffer (e.g., of a memory controller) during the transferring (e.g., folding). However, due to the relatively long duration of the transferring (e.g., folding) operations, the buffer may be filled with additional host data before transferring (e.g., folding) is complete, resulting in the memory system being unable to support (e.g., reject) one or more host access (e.g., write) commands. That is, if the buffer is full, host writing may be suspending until after the transferring (e.g., folding) is complete and the data from the buffer is flushed to the corresponding dies, thereby further reducing host write performance.

To avoid suspending transferring (e.g., folding) or delaying (e.g., rejecting) host writes during concurrent host write and transferring (e.g., folding) operations, data intended for a busy die (e.g., a die occupied with transferring) may instead be written to an accessible die (e.g., a die unoccupied with transferring). In this way, transferring (e.g., folding) may continue while supporting concurrent host writes. For example, host data from the buffer may be flushed to the accessible die (e.g., rather than the intended busy die), which may prevent the buffer from filling and suspending subsequent host writes. As a result, host writes may continue without the suspension of the folding operation (and vice versa), thereby improving host write performance and reducing a latency at which data blocks are freed. In some examples, a portion of the buffer (e.g., cache) may be allocated for temporarily storing data to be written to the accessible die. Further, data may be re-ordered during transferring (e.g., folding) to accommodate one or more sequential read operations, thus supporting out-of-order writing to non-target dies as described herein, among other benefits.

Features of the disclosure are initially described in the context of systems, devices, and circuits with reference to FIG. 1. Features of the disclosure are described in the context of data storage diagrams, buffer status diagrams, and parity data generation diagrams with reference to FIGS. 2 through 4. These and other features of the disclosure are further illustrated by and described in the context of a block diagram and flowchart that relate to techniques for improving host write performance during data folding with reference to FIGS. 5 through 6.

FIG. 1 illustrates an example of a system 100 that supports techniques for improving host write performance during data folding in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally, or alternatively, a NAND memory device 130 may include memory cells configured to each store multiple bits of information, which may be referred to as multi-level cells (MLCs) if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support techniques for improving host write performance during data transferring (e.g., folding). As used herein, transferring of data may include folding. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

In accordance with examples described herein, to avoid suspending folding or delaying (e.g., rejecting) host writes during concurrent host write and folding operations, data indicated (e.g., by a command) to be written to a busy die 160 (e.g., a die 160 occupied with folding) may instead be written to an accessible die 160. In this way, folding may continue while supporting concurrent host writes, thereby improving host write performance and reducing a latency at which blocks 170 (e.g., including pages 175) are freed. In some examples, a portion of a buffer (e.g., a local memory 120 serving as a cache for the memory system controller 115) may be allocated for receiving data intended for a busy die 160 (e.g., to be written to the accessible die 160 instead). As such, at least the portion of the buffer may be available to receive and temporarily store host data before being written to the accessible die 160. Further, data may be re-ordered during folding to accommodate one or more sequential read operations.

In some examples, the techniques described herein may free a buffer (e.g., the local memory 120) as described with reference to FIGS. 3A and 3B. Additionally, or alternatively, intermittent parity data for portions of a pageline (e.g., including one or more pages 175) may be generated and combined to generate parity data for the pageline as described with reference to FIG. 4. In case of a power-off of the memory system, intermittent parity data, a last-written-to page 175, or both, may be stored before the power-off, and in some cases a read scan may be performed after power-on to determine a last written-to page 175.

Figure 2:
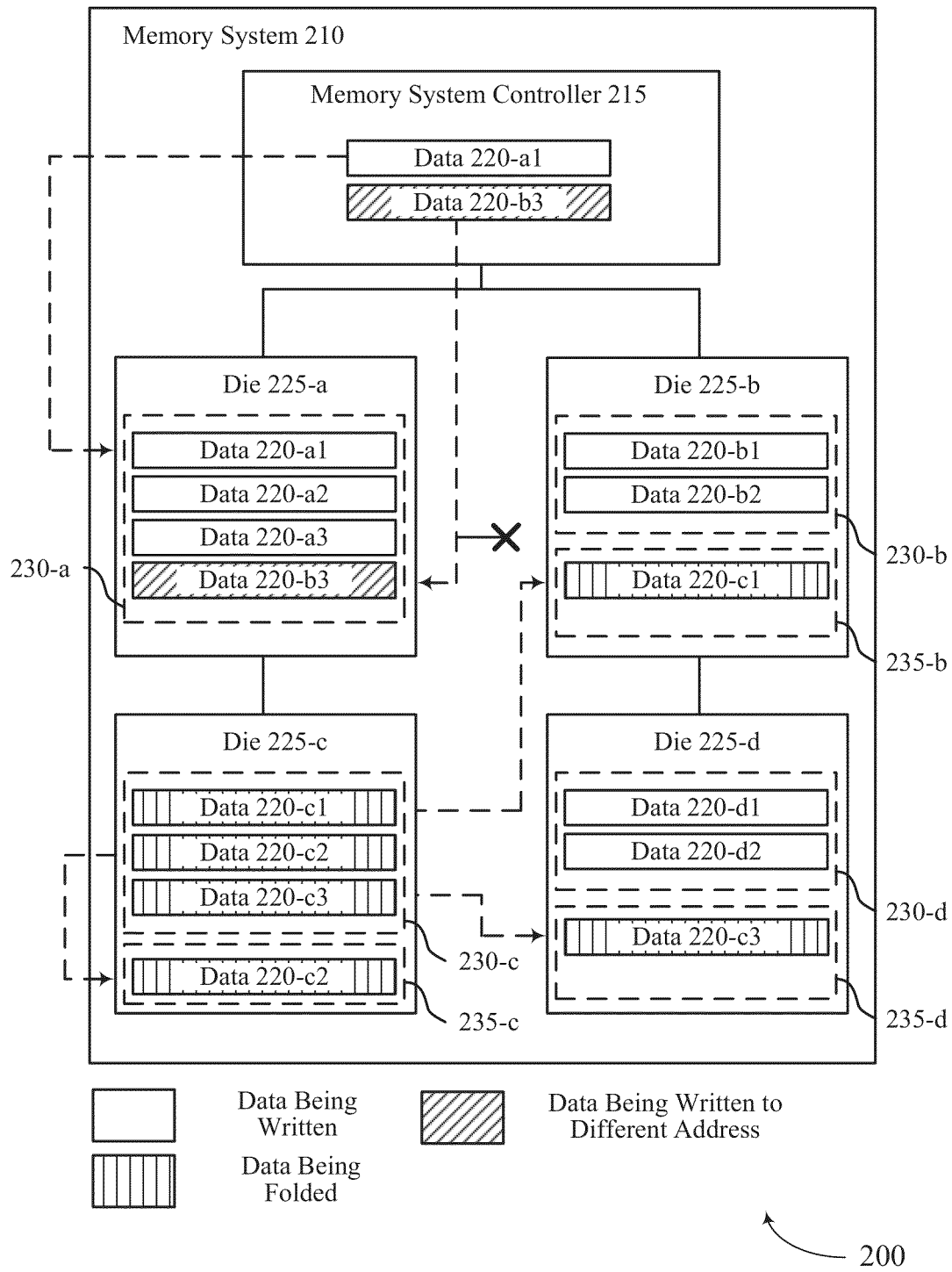
FIG. 2 illustrates an example of a data storage diagram that supports techniques for improving host write performance during data folding in accordance with examples as disclosed herein.

FIG. 2 illustrates an example of a data storage diagram 200 that supports techniques for improving host write performance during data folding in accordance with examples as disclosed herein. The data storage diagram 200 may illustrate operations of one or more components of a system 100, as described with reference to FIG. 1. For example, the data storage diagram 200 may illustrate a memory system 210 including a memory system controller 215, where the memory system 210 and the memory system controller 215 may be examples of a memory system 110 and a memory system controller 115, respectively, as described with reference to FIG. 1. The data transfer diagram 200 may illustrate writing data 220 to and transferring (e.g., folding) data 220 between one or more dies 225 (e.g., dies 225-a through 225-d), which may be examples of one or more dies 160 as described with reference to FIG. 1. In some cases, the memory system 210 may support writing data 220 intended for a busy die 225 to an accessible die 225 based on performing host writes concurrent with transferring (e.g., folding) data 220 between one or more dies 225. In some examples, the memory system controller 215 may represent a controller including volatile memory, such as SRAM, among other types of volatile memory. For example, the memory system controller 215 may include a buffer (e.g., including the local memory 120) that includes SRAM memory.

Each die 225 may each include any quantity of source data blocks 230 and destination data blocks 235. In some examples, the data blocks may be examples of blocks 170 as described with reference to FIG. 1. In the example of FIG. 2, the die 225-a may include a source data block 230-a, the die 225-b may include a source data block 230-b and a destination data block 235-b, the die 225-c may include a source data block 230-c and a destination data block 235-c, and the die 225-d may include a source data block 230-d and a destination data block 235-d. Each of the source data blocks 230 may be operable to store data 220 in one or more pages (e.g., pages 175) of the respective source data block 230. In some examples, a source data block 230 may represent a destination data block 235, or vice versa, depending on how the source data block 230 or the destination data block 235 is used during one or more access or transfer operations. For example, a source data block 230 may be a data block from which data is transferred as part of a folding operation, and destination data block 235 may be a data block to which data is transferred as part of a folding operation.

In some examples, the data blocks may be part of or be examples of one or more virtual blocks 180 as described with reference to FIG. 1. For example, a virtual block 180 may include one or more data blocks of a single die (e.g., the die 225-a), or may include one or more data blocks of multiple dies (e.g., the source data blocks 230-a through 230-d). In some examples, the memory system 210 may include one or more pagelines. For example, a pageline may include a same page (e.g., a first page) within each plane of one or more dies 225.

In some cases, the source data blocks 230 and the destination data blocks 235 may include SLCs, MLCs, TLCs, or QLCs, at a given time. That is, memory cells of a data block may be programmed as one type of memory cell at a first time and as a second type of memory cell at a second time (e.g., after erasure of the data block). Lower storage density memory cells, (e.g., memory cells storing fewer bits per memory cell, such as SLCs, MLCs, and TLCs) may have faster program times (e.g., TPROG) compared to higher storage density memory cells, (e.g., QLCs). For example, SLCs and TLCs may have a TPROG of approximately 85 μs and 320 μs, respectively, whereas QLCs may have a TPROG of approximately 4 ms or longer. In some cases, programming to (e.g., writing to) QLCs may include two-pass programming including performing two sets of to accurately program one or more QLCs. For example, a first pass of programming a QLC may span a duration of 3 ms, whereas a second pass of programming a QLC may span a duration of 4 ms. In some cases, data blocks to which data is written as part of a host write may be data blocks that include lower storage density memory cells. For examples, if used to store data as part of a host write, the source data blocks 230 may include low storage density memory cells (e.g., SLCs, MLCs, or TLCs), which may allow faster writing to the source data blocks 230. Additionally, or alternatively, the destination data blocks 235 may include high storage density memory cells (e.g., QLCs) to enable compact information storage. In some examples, a source data block 230 may include higher storage density memory cells, for example, if previously functioning as a destination data block 235.

In some examples, the memory system 210 may perform one or more access (e.g., write) operations in response to one or more commands received from a host system, such as the host system 105 described with reference to FIG. 1. For example, the memory system controller 215 may receive a command from the host system 105 to write data 220-*a*1 to an address of the source data block 230-*a* of the die 225-*a*. The memory system controller 215 may store the data 220-*a*1 within a buffer of the memory system controller 215 (e.g., a local memory 120). After storing the data within the buffer, the memory system controller 215 may write the data 220-*a*1 to a first page of the block 230-*a* having the indicated address. Similarly, the memory system controller 215 may receive one or more additional commands indicating addresses in the source data blocks 230-*a*, 230-*b*, 230-*c*, and 230-*d* of the dies 225-*a*, 225-*b*, 225-*c*, and 225-*d*, respectively. For example, the memory system controller 215 may write data 220-*a*2 and 220-*a*3 to the die 225-*a*, may write the data 220-*b*1 and 220-*b*2 to the die 225-*b*, may write the data 220-*c*1, 220-*c*2, and 220-*c*3 to the die 225-*c*, and may write the data 220-*d*1 and 220-*d*2 to the die 225-*d* as illustrated in FIG. 2.

In some examples, the memory system 210 may determine to transfer (e.g., fold) data 220 from one or more of the source data blocks 230 to one or more of the destination data blocks 235. For example, the memory system controller 215 may determine that an amount of available (e.g., free) source data blocks 230 fails to satisfy a first threshold quantity of available source data blocks 230 or determine to transfer the data 220 during an idle time of the memory system 210, among other reasons to transfer the data 220. In some cases, an available source data block 230 may be a source data block 230 with one or more pages that have not yet been written to or that have been freed (e.g., by garbage collection, folding, erasure). The memory system controller 215 may thus begin folding data 220 (e.g., initiate a transfer of the data 220, such as part of garbage collection) from pages of one or more source data blocks 230 to one or more destination data blocks 235 to free source data blocks 230. In the example of FIG. 2, the memory system controller 215 may fold the data 220-*c*1 from the source data block 230-*c* to the destination data block 235-*b*. Similarly, the memory system controller 215 may fold the data 220-*c*2 to the destination data block 235-*c* (e.g., within the same die), and may fold the data 220-*c*3 to the destination data block 235-*d*.

In some examples, the memory system 210 may not support concurrent folding and access operations (e.g., host writes) for a same die 225 at the same time, and may increase a quantity of dies 225 involved in folding operations over time due to this lack of support. In an example, the memory system 210 may transition to using 4 dies for host writing, 3 dies for host writing and 1 die for folding, 2 dies for host writing and 2 dies for folding, 1 die for host writing and 3 dies for folding, and 4 dies for folding, for example, based on a quantity of available source data blocks 230. For instance, as the quantity of available source data blocks 230 decreases, the memory system 210 may occupy additional dies 225 with folding to increase a rate at which source data blocks 230 are made available. In some examples, the buffer (e.g., cache) of the memory system controller 215 (e.g., a portion of the buffer allocated to support host writing) may begin to fill up due to the time duration for folding (e.g., to QLCs) being longer than the time duration for writing to source data blocks 230 (e.g., to SLCs or TLCs). Thus, as the memory system controller 215 receives commands indicating to write data 220 to one or more dies 225 that are occupied with folding, the buffer may hold the data 220 instead of performing host writes. As folding may be slower than host writes, the buffer may eventually fill up, resulting in rejection or delay of one or more host write commands. In some cases, the memory system controller 215 may implement one or more operations to perform folding and host writes concurrently at a die 225, however, this may require additional delays in host writes as well as greater quantity of operations.

As described herein, the memory system 210 may avoid suspending folding and rejecting one or more host access (e.g., write) commands during concurrent host writes and folding by writing data 220 that is intended for a busy die 225 to an accessible die 225 instead. For example, the memory system controller 215 may receive (e.g., from a host system 105) a command indicating to write data 220-*b*3 to die 225-*b* and may store the data 220-*b*3 in the buffer of the memory system controller 215. In response to determining that the die 225-*b* is busy folding (e.g., during the folding operation of the data 220-*c*1 to QLC of the die 225-*b*), the memory system controller 215 may write the data 220-*b*3 to the die 225-*a* due to the die 225-*a* being accessible (e.g., not occupied with folding). For example, the memory system controller 215 may write the data 220-*b*3 to the source data block 230-*a* concurrent with folding operations of one or more other dies 225 (e.g., of the dies 225-*b* through 225-*d*).

The memory system 210 may also allocate a portion of the buffer (e.g., volatile memory of the memory system 210) for receiving and temporarily storing data 220 intended for busy dies 225 that may instead be written to accessible dies instead. For example, a quantity of bits allocated in the buffer may be determined according to a quantity of planes of each die 225 and a type of storage for host writes (e.g., SLC or TLC) as described with reference to FIGS. 3A and 3B. In some cases, after the folding operations of the die 225-*b* are complete, the memory system controller 215 may receive a command to write additional data 220 to the die 225-*b*, and may write the data 220 to the die 225-*b* based on the die 225-*b* being free from folding.

In some examples, the memory system 210 may reorder data 220 across the dies 225 during one or more folding processes as described herein. For example, the memory system 210 may receive one or more commands to write the data 220-*c*1, 220-*c*2, and 220-*c*3, and the memory system controller 215 may write the to the source data block 230-*c* as described herein. However, in some cases, as the data 220 may not be written in an order for a multi-die sequential read (which may be referred to as a Big-Z read), a re-order of the data 220 may be performed during folding. For example, the memory system controller 215 may re-order the data 220-c1, 220-c2, and 220-c3 by folding the data 220 to a same pageline of one or more destination data blocks 235 across the dies 225. By folding the data 220 to a same pageline, the data 220-c1 through 220-c3 may be sequentially read across the dies 225. Re-ordering the data 220 during folding may enable the writing of data 220 to non-intended dies 225. For example, the memory system controller 215 may additionally receive one or more commands to write the data 220-b1, 220-b2, and 220-b3 to the die 225-b, but may write the data 220-b3 to the die 225-a, as described herein, due to the die 225-b being busy with folding operations. The memory system controller 215 may re-order the data 220-b1, 220-b2, and 220-b3 during a folding operation including the data 220, regardless of writing the data 220-b3 to a non-intended die 225, such that the data 220-b may be sequentially read.

In another example, the memory system 210 may suspend folding operations to accommodate host writes in response to a quantity of available source data blocks 230 satisfying (e.g., being greater than or equal to) a threshold quantity of available source data blocks 230. For example, the memory system controller 215 may begin performing folding operations using the dies 225-b, 225-c, and 225-d (e.g., of the data 220-c1), and may receive the command indicating to write the data 220-b3 to the source data block 230-b of the die 225-b as described herein. After receiving the command, the memory system controller 215 may determine that a quantity of available source data blocks 230 is above the threshold quantity, and may suspend the folding operations to enable the memory system 210 to write the data 220-b3 to the die 225-b. In some cases, suspending the folding operations may increase a speed of host write operations (e.g., by enabling data 220 to be flushed from the buffer to the intended dies 225), while decreasing a quantity of data blocks that are freed by delaying the folding to the free the data blocks. In some examples, the memory system controller 215 write data 220 (e.g., the data 220-b3) intended for dies 225 that are busy with folding (e.g., the die 225-b) to accessible dies (e.g., the die 225-a) in response to determining that the quantity of available source data blocks 230 of the memory system 210 fail to satisfy (e.g., is lower than) the threshold quantity.

In some examples, the memory system 210 may generate parity data for pagelines, including intermittent parity data, according to the host write processes and folding processes described herein as described with reference to FIG. 4. Additionally, or alternatively, the memory system 210 may accommodate unplanned power-off or sudden power-off (SPO) scenarios by storing and/or reading data, parity data, last-written-to page indications, or any combination thereof, as well as performing read scans as described with reference to FIGS. 3A through 4.

The techniques described herein may provide increased efficiency and performance as well as reduced latency in operations of the memory system 210. For example, by writing data 220 (e.g., the data 220-b3) intended for one die 225 to an accessible die during folding, the operations described herein may free up memory of a buffer of the memory system controller 215. Freeing up the buffer, for example, allocating a portion of the buffer for data 220 to be written to accessible dies 225 and flushing data 220 to accessible dies 225 may enable the memory system controller 215 to continue to receive host write commands and to refrain from rejecting host write commands during folding operations. The operations described herein may improve a latency of access operations (e.g., by avoiding delaying host writes), which may meet one or more latency, host write, or customer requirements (e.g., host write speed may not fall below 60 MB/s), while also tolerating large writes with possible overwrite, or small time intervals between writes. Additionally, writing to accessible dies 225 may enable the use of a relatively small size for the buffer for the memory system controller 215. The techniques described herein may also lead to less performance degradation due to re-order during folding and the small size of the buffer, as well as due to the data remaining in the buffer for a small amount of time.

Figure 3A:
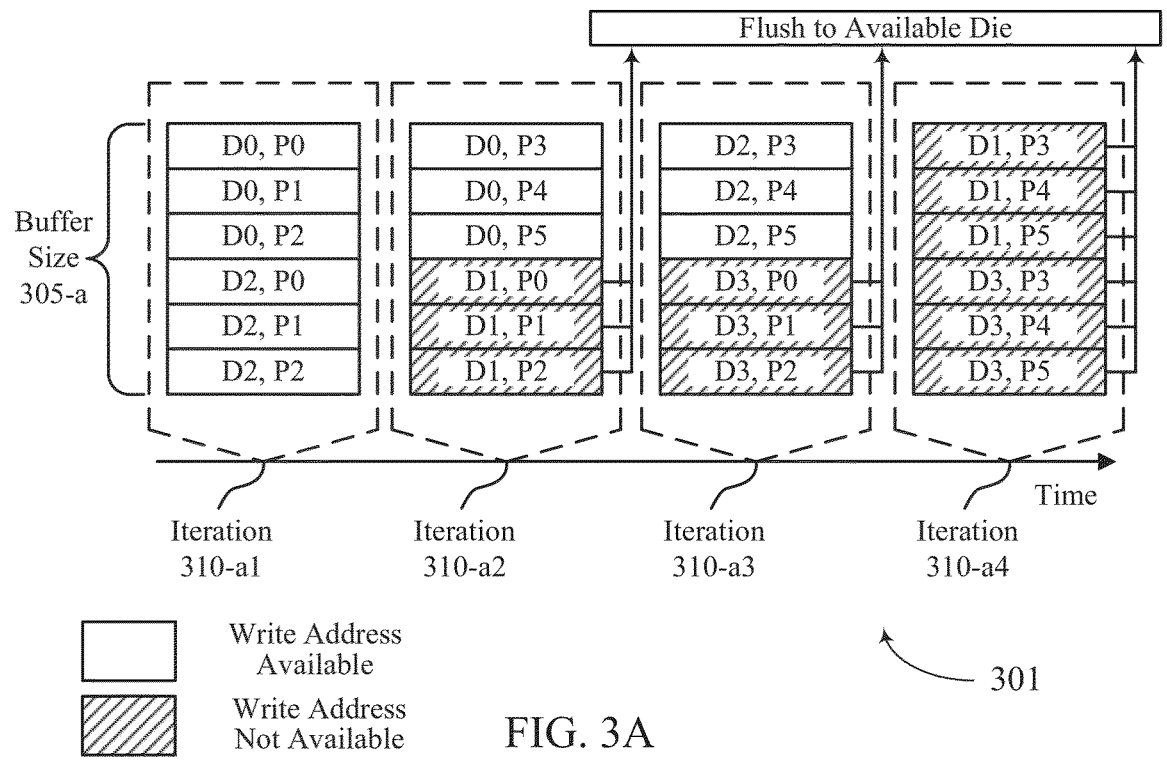
FIGS. 3A and 3B illustrate examples of buffer status diagrams that supports techniques for improving host write performance during data folding in accordance with examples as disclosed herein.
Figure 3B:
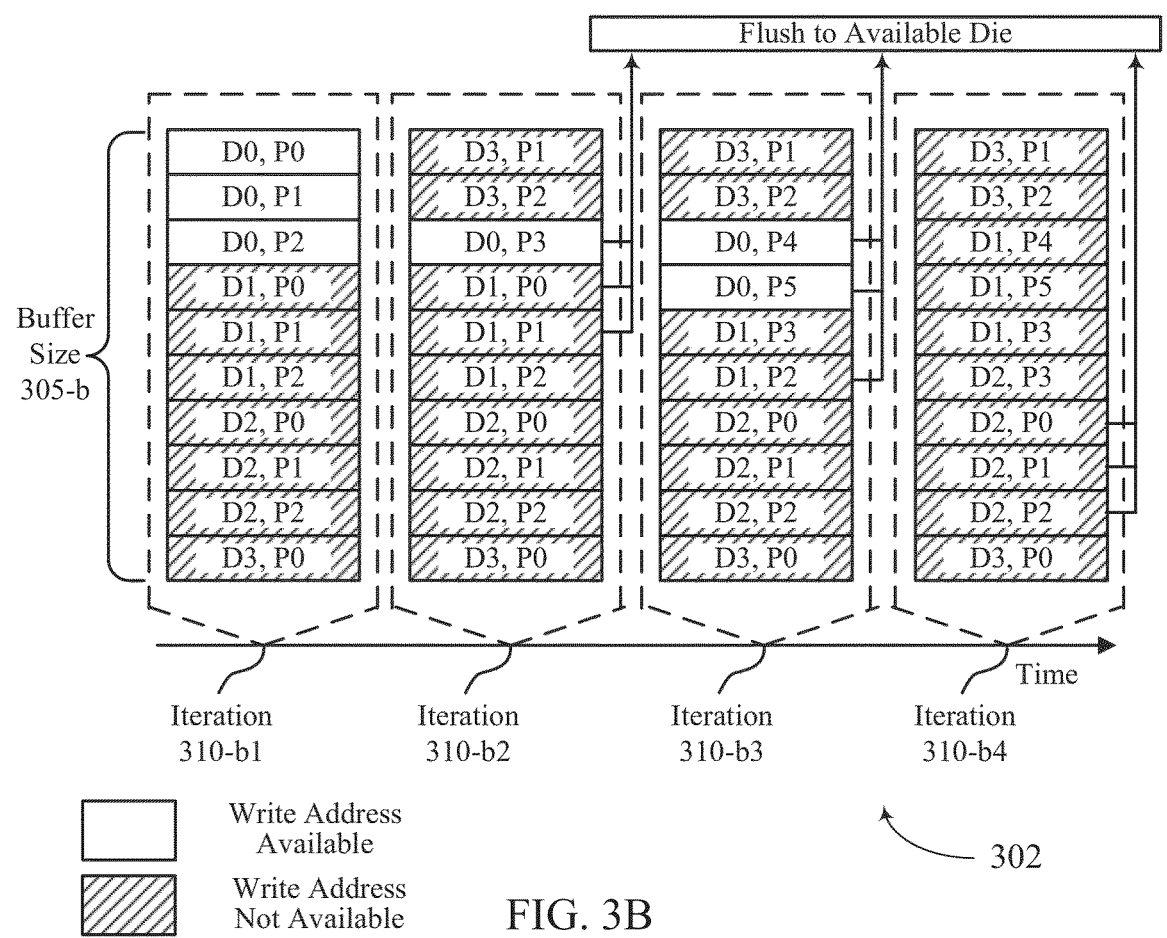

FIGS. 3A and 3B illustrate examples of buffer status diagrams 301 and 302 that support techniques for improving host write performance during data folding in accordance with examples as disclosed herein. For example, the buffer status diagrams 301 and 302 may illustrate a buffer (e.g., including local memory 120) of a memory system controller 215 for a memory system 210 with four dies 225 as described with reference to FIG. 2. The four dies may be referred to as D0, D1, D2, and D3, which may refer to dies 225-a through 225-d, respectively. The buffer status diagram 301 may illustrate an example of the buffer having a first (e.g., smaller) buffer size 305-a, and where two dies, D1 and D3, may be occupied with folding. Similarly, the buffer status diagram 302 may illustrate the buffer of the memory system controller 215 having a second buffer size 305-b larger than the first buffer size 305-a, and where three dies, D1, D2, and D3, of the four dies may be occupied with folding.

In FIG. 3A, the buffer status diagram 301 may represent the buffer of the memory system controller 215 having the first buffer size 305-a allocated for writing data (e.g., data 220) to data blocks of D1-D4 of the memory system 210. In the example of FIG. 3A, the data blocks may be configured to include TLCs. In some cases, the buffer may include volatile memory for storing data intended for writing to up to 6 pages (e.g., pages 175) of each plane (e.g., plane 165) of a die (or 6 pages across planes of multiple different dies). For example, data depicted as being for P0 of D0 in FIG. 3A may be representative of data for P0 of each plane of D0. Each page may hold up to approximately 16 kilobytes (KB) of data, and each die may include 4 planes, resulting in a total buffer size 305-a of 4 (planes)*16 KB*6 (pages)=384 KB for storing data.

In a first iteration 310-a1, the buffer may be free. The memory system controller 215 may receive one or more commands indicating to store data in three pages P0, P1, and P2, of D0, and one or more commands indicating to store additional data in three pages P0, P1, and P2, of D2, and may store the data (e.g., 384 KB) in the buffer, filling the buffer. In response to D0 and D2 being accessible (e.g., not being busy with folding), the memory system controller 215 may flush the data for D0 to one or more data blocks (e.g., source data blocks 230) of D0 and may flush the data for D2 to one or more data blocks of D2. In some examples, the memory system controller 215 may flush data one page at a time (e.g., may flush data to P0 of D0, then may flush data to P1 of D0, etc.). In some examples, the memory system controller 215 may flush the data to one or more dies at a time. For example, the memory system controller 215 may flush the data to D0 followed by flushing the data to D2 or may flush the data to D0 concurrent with flushing the data to D2. In a second iteration 310-a2, the memory system controller 215 may receive commands for writing data to additional pages of D0, and may store the data in the buffer and later flush the data to D0 in response to D0 being accessible.

As described herein with reference to FIG. 2, the memory system controller 215 may write data intended for busy dies to accessible dies. For example, in the second iteration 310-a2, the memory system controller 215 may receive commands for writing data to D1, and may flush the data intended for D1 to an accessible die, such as D2. That is, concurrent with folding operations associated with D1, the memory system controller 215 may write the data intended for D1 to D0 or D2. Similarly, in a third iteration 310-a3, the memory system controller 215 may receive one or more commands indicating to store data in three pages of D2 and one or more commands indicating to store additional data in three pages of D3, and may flush the buffer by writing the data intended for D2 to D2, and writing the data intended for D3 to an accessible die (e.g., D0 or D2). Additionally, or alternatively, in a fourth iteration, the memory system controller 215 may receive one or more commands to write data to additional pages P3, P4, and P5 of D1 as shown in FIG. 3A and to additional pages P3, P4, and P5 of D3. In response to both D1 and D3 being occupied with folding, the memory system controller 215 may flush the entire buffer to accessible dies D0 or D2, or split amongst both.

By writing data intended for busy dies to accessible dies, the memory system controller 215 may be able to flush additional data from the buffer than otherwise possible before a next iteration 310, freeing the buffer for storing data of additional commands. For example, without flushing the data intended for D1 in the second iteration 310-a2, the buffer may retain this data during the next iteration (the third iteration 310-a3) leaving half of the buffer (e.g., 192 KB for three pages) empty. This may eventually lead to receiving and flushing the data for P3 through P5 of D2 during the third iteration 310-a3, but then also receiving and then retaining the data for P0 through P2 of D3 during the fourth iteration 310-a4 in response to D3 being busy. Thus, the buffer may fill up and result in the memory system controller 215 rejecting the commands to write the additional data to P3 through P5 of D1 and D3 during further iterations 310, for example, until after the folding associated with D1 and D3 is complete and the retained data is written to the corresponding dies. By flushing the data intended for busy dies D1 and D3 during each iteration 310, the memory system controller 215 is instead able to free up the buffer at least partially to receive data from the host system for each new iteration 310.

In some examples, the memory system controller 215 may allocate a portion of the buffer, such as half of the buffer (e.g., 192 KB), among other quantities of the buffer, for receiving data intended for busy dies (e.g., to be written instead to accessible dies). For example, the memory system controller 215 may allocate a portion of the buffer for storing data for three pages as described with reference to FIG. 3B. In some examples, a quantity of the buffer reserved (e.g., allocated) for receiving the busy die data may be based on a type of host write, a type of memory cell written to as part of the host write, or a combination thereof. For example, if performing a write burst operation, writing to SLCs, or a combination thereof, at least a first quantity of memory corresponding to one page per plane of an accessible die (e.g., 16 KB*4 planes=64 KB) may be allocated for receiving host data and flushing to the accessible die. If performing a write operation (e.g., write burst is off), writing to TLCs, or a combination thereof, at least a second quantity of memory corresponding to 3 pages per plane of an accessible die (e.g., 16 KB*4 planes*3 pages=192 KB) may be allocated for receiving host data and flushing to the accessible die, for example, due to a page of TLCs storing three SLC pages worth of data.

In some examples, the memory system controller 215 may determine a last-written-to page after a power-off of the memory system 210 to continue writing operations. For example, the memory system controller 215 may write across multiple dies as described herein. However, one or more blocks of a virtual block may have a different amount of pages written to, for example, due to writing data intended for busy dies to available dies. Thus, after a power-off of the memory system 210, the memory system controller 215 may be unaware of a last written-to page of each die since each die may have a different amount of written-to pages, and may be unable to continue write operations without determining such information. Thus, the memory system controller 215 may determine a last-written-to page of each die using one or more methods.

For example, the memory system controller 215 may receive an indication of an upcoming SPO, and may store an indication of a last-written-to page of each die to memory of the memory system 210 (e.g., in NAND with metadata) before the SPO. For instance, the memory system controller 215 may store respective metadata to non-volatile memory (e.g., of the dies 225) that indicates the last-written-to page of a respective die. After power-on, the memory system controller 215 may read the indication (e.g., the metadata), and may continue performing host write and folding operations from the respective last-written-to pages. For example, the memory system controller 215 may store an indication during the first iteration 310-a1 of P2 for D0 and P2 for D2 as the last-written-to pages of D0 and D2, and after power-on, may begin writing to P3 of D0 and D2 during the second iteration 310-a2 and so on. Additionally, or alternatively, the memory system controller 215 may perform a read scan following power-on to determine the last-written-to page of each die. For example, an SPO may occur before the memory system controller 215 is able to receive an indication of the SPO and store the indication of the respective last-written-to-pages, and the memory system controller 215 may perform a read scan of one or more data blocks of the dies D0 through D3 following power-on to determine the last-written-to pages 175 instead. In an example, to perform the read scan, the memory system controller 215 may perform a binary search procedure to determine a respective last page storing data (e.g., as opposed to being an empty page storing no data).

In the example of FIG. 3B, the buffer of the memory system controller 215 may have the second buffer size 305-b allocated for commands to write data to data blocks of the four dies D0 through D3, where D1 through D3 may be occupied with folding as described herein with respect to FIG. 2. The second buffer size 305-b may be greater than the first buffer size 305-a, including memory to store data for up to 10 pages 175 for each plane 165 of a die (or across multiple different dies), including a total buffer size 305-b of 4 (planes)*16*10 (pages)=640 KB for data. In some examples, FIG. 3B may represent the memory system controller 215 allocating a portion of the buffer for storing data for three pages.

The memory system controller 215 may similarly flush data intended for busy dies to accessible dies. For example, during a first iteration 310-b1, the memory system controller 215 may flush data intended for P0 through P2 of D0 to D0 in response to D0 being accessible, and may retain other data intended for D1 through D3 (e.g., as three pages have already been written). In a second iteration 310-b2, the memory system controller 215 may receive next data to be written, including data to be written to P1 and P2 of D3 and P3 of D0, and may not store (e.g., receive) additional host data due to the buffer being full. In the example of FIG. 3B, the memory system controller 215 may flush the data intended for P3 of D0 to D0 and may flush additional data intended for busy dies for two more pages. For example, the memory system controller 215 may flush next data to D0 based on an order in which data was written to the buffer, including data intended for P0 and P1 of D1. Similarly, in a third iteration 310-*b*3 and a fourth iteration 310-*b*4, the memory system controller 215 may receive next data and flush data based on the order data was received by the buffer. For example, the memory system controller 215 may receive data for P4 and P5 of D0 and data for P3 of D1 and flush the P4 and P5, D0 data and the P2, D1 data in the third iteration 310-*b*3. The memory system controller 215 may also receive data for P4 and P5 of D1 and data for P3 of D2 and flush the P0, P1, P2, D2 data in the fourth iteration 310-*b*4.

Additionally, or alternatively, the memory system controller 215 may flush data intended for busy dies in any order. For example, the data may be flushed according to the order that it was stored to the buffer, such as flushing the P0-2, D0 data in the first iteration 310-*b*1, the P0-2, D1 data in the second iteration 310-*b*2, the P0-2, D2 data in the third iteration 310-*b*3, and so on.

The techniques described herein may provide increased efficiency and performance as well as reduced latency in operations of the memory system 210. For example, by flushing data intended for busy dies (e.g., D1 and D2 in FIG. 3A or D1, D2, and D3 in FIG. 3B) to accessible dies (e.g., D0 and D2, or D0), the buffer of the memory system controller 215 may be freed, enabling the memory system controller 215 to continue to receive host access commands during folding operations. A latency of operations (e.g., by avoiding delaying host writes) and performance degradation may be decreased, which may meet one or more latency, host write, or customer requirements, while also tolerating large writes with possible overwrite or tolerating small intervals between writes. Additionally, flushing data intended for busy dies may enable the use of a smaller buffer for the memory system controller 215, thereby reducing a cost of the memory system 210.

Figure 4:
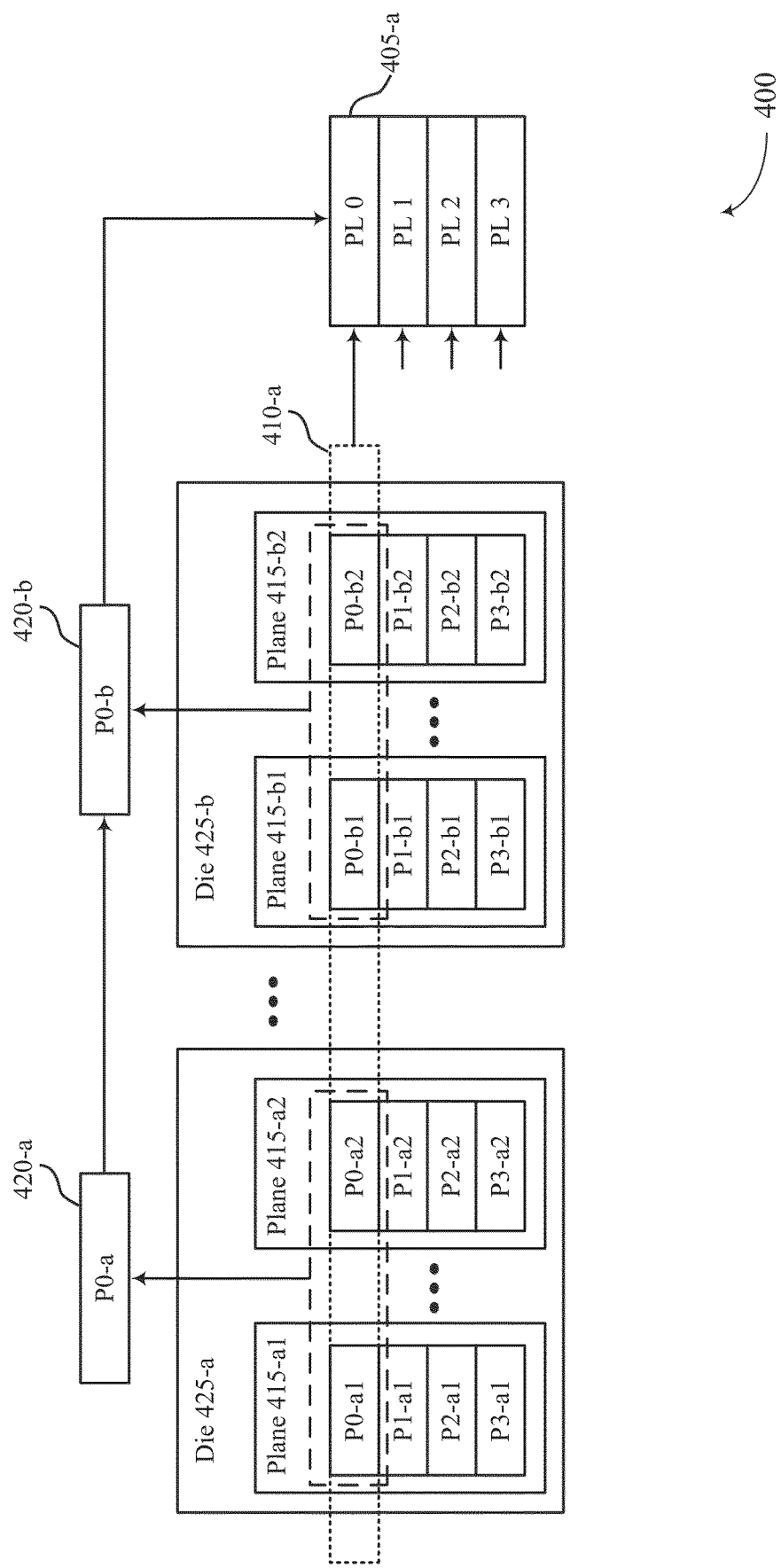
FIG. 4 illustrates an example of a parity data generation diagram that supports techniques for improving host write performance during data folding in accordance with examples as disclosed herein.

FIG. 4 illustrates an example of a parity data generation diagram 400 that supports techniques for improving host write performance during data folding in accordance with examples as disclosed herein. For example, the parity data generation diagram 400 may illustrate generating parity data 405 for one or more pagelines 410 (e.g., the pageline 410-*a*). Each pageline may include respective pages of each plane 415 of each die 425-*a* through 425-*b*. The parity data 405, pagelines 410, pages, planes 415, and dies 425 may represent parity data, pagelines, pages 175, planes 165, and dies 225 or 160, respectively, as described with reference to FIGS. 1 through 3B. In some examples, the dies 425-*a* through 425-*b* may be part of a memory system 210 (or 110) including a memory system controller 215 (or 115) as described with respect to FIGS. 1 through 3B. In some examples, the operations described herein may be performed by the memory system controller 215, or by another device of the memory system 210. In some cases, FIG. 4 may illustrate generating redundant array of independent not-and (NAND) (RAIN) parity data for one or more pagelines 410 of the dies 425-*a* through 425-*b*. In some examples, the dies 425-*a* through 425-*b* may represent two dies, or may include any quantity of dies between the die 425-*a* and the die 425-*b*.

The memory system 210 may generate parity data 405 (e.g., RAIN parity data) for each pageline 410 of the dies 425-*a* through 425-*b*. For example, after data has been written to the pageline 410-*a* (PL 0) across all of the dies 425, the memory system controller 215 may generate parity data 405-*a* for the pageline 410-*a*. For example, generating parity data 405-*a* may include performing an logic operations, such as an XOR operation, on each of the pages across the pageline 410-*a*. In some examples, the memory system 210 may generate the parity data 405-*a* using the memory system controller 215 or another device of the memory system 210.

As described herein, the memory system controller 215 may in some examples write data to the dies 425 in an order that is not sequential. For example, the memory system controller 215 may write data to intended for die 425-*a* to P0-*a*1 through P0-*a*2 of die 425-*a*, where the die 425-*a* may not be busy with folding operations. However, the die 425-*b* may be occupied with folding (e.g., with data transfer, such as part of garbage collection) and instead of writing data intended for the die 425-*b* to P0-*b*1 through P0-*b*2, the memory system controller 215 may instead write such data to P1-*a*1 through P1-*a*2 of the die 425-*a*. Thus, the pageline 410-*a* (PL 0) may be an incomplete, or a partial pageline, since P0-*b*1 through P0-*b*2 are not yet written to, and parity data may not yet be generated for PL 0.

In some cases, the memory system 210 may generate intermittent parity data 420 (e.g., intermittent RAIN parity data) for pages of each die 425 after writing to the pages, where the intermittent parity data 420 may be used for generating parity data 405 for entire pagelines 410. For example, after writing the data 220 to P0-*a*1 through P0-*a*2 of the die 425-*a*, the memory system controller 215 may generate intermittent parity data 420-*a* by reading data stored in a first page (P0) across planes 415-*a*1 through 415-*a*2 of the die 425-*a* and performing an XOR operation of the data. At a later time after finishing one or more folding operations with the die 425-*b*, the memory system controller 215 may write data to remaining pages of the pageline 410-*a*. For example, the memory system controller may write data to P0-*b*1 through P0-*b*2 of the planes 415-*b*1 through 415-*b*2 of the die 425-*b*. The memory system controller 215 may generate intermittent parity data 420-*b* corresponding to P0-*b* of the planes 415 of the die 425-*b* (e.g., by performing XOR across P0 of all planes 415 of the die 425-*b*).

Once intermittent parity data 420 has been generated for all pages P0 of the pageline 410-*a* across the dies 425-*a* and 425-*b*, the memory system controller 215 may combine the intermittent parity data 420-*a* and 420-*b* (and intermittent parity data 420 for P0 of any intervening dies 425) to generate the parity data 405-*a* for the pageline 410-*a*. In some cases, combining the intermittent parity data 420 may include performing an XOR operation of the intermittent parity data 420.

In an example, the memory system controller 215 may store the intermittent parity data 420 in one or more retention data blocks of the memory system 210 (e.g., in a low power mode), where a retention data block may represent a block of the memory system 210 reserved for additional memory and not used in normal operations. In some cases, generating the parity data 405 may include reading the intermittent parity data 420 from the retention data blocks. Additionally, or alternatively, the memory system controller 215 may perform a read scan of the pages P0 of each die 425-*b* for generating the intermittent parity data 420 and the parity data 405-*a* after (e.g., once, in response to) all pages P0 of PL 0 have been written to, where a read scan may include reading the data from one or more pages to use to generate the intermittent parity data 420. In some examples, the memory system 210 may generate the intermittent parity data 405 using the memory system controller 215 or another device of the memory system 210 (e.g., using a respective local controller for each die 425, such as a local controller 135).

In some examples, the memory system controller 215 may receive (e.g., from a host system 105), an indication of a power-off of the memory system, such as an SPO as described herein. In response to receiving an indication of an SPO, the memory system controller 215 may store the intermittent parity data 420-*a*, 420-*b*, or both, to one or more data blocks (e.g., source data blocks 230) of the memory system 210 (e.g., temporary dump SLCs or static SLCs). After a power-on of the memory system 210, the memory system controller 215 may read the stored intermittent parity data 420 from the one or more data blocks of the memory system 210 for generating the parity data 405-*a* for the PL 0. Additionally, or alternatively, the memory system controller 215 may store the intermittent parity data 420 in a same data block to save rebuild time. By way of another example, the memory system controller 215 may perform a read scan after power-on to determine a respective last-written-to page of each die 425-*a* and 425-*b*, to generate the parity data 405-*a*, to generate the intermittent parity data 420, or any combination thereof. Additionally, or alternatively, the memory system controller 215 may store an indication of a last-written-to-page with the stored intermittent parity data 420, or with metadata as described with reference to FIGS. 3A and 3B. The memory system 210 may similarly generate parity data 405 and intermittent parity data 420 for other pagelines 410, including PL 1 through PL 3 with pages P1 through P3 for each plane 415 of each memory die 425 of the memory system 210 using the techniques described herein.

Generating intermittent parity data 420 may improve performance of the memory system. For example, with a large amount of "dirty" writes, where data is written in a non-sequential order (e.g., due to host writes to accessible memory dies 425 during folding), generating and storing intermittent parity data may decrease an amount of time to generate parity data (e.g., RAIN parity data) for PLs (e.g., PL 0) by generating parity data during one or more write and folding processes. Doing so may be faster compared to generating parity data for an entire pageline once the entire pageline has been written to. By implementing the techniques described with respect to FIG. 4, a write speed may be increased proportionate to a quantity of "dirty" writes done at one time. Alternatively, performing garbage collection more frequently may meet one or more customer requirements. Additionally, by storing intermittent parity data 420 during power-off or performing a read scan, rebuild time may be saved.

Figure 5:
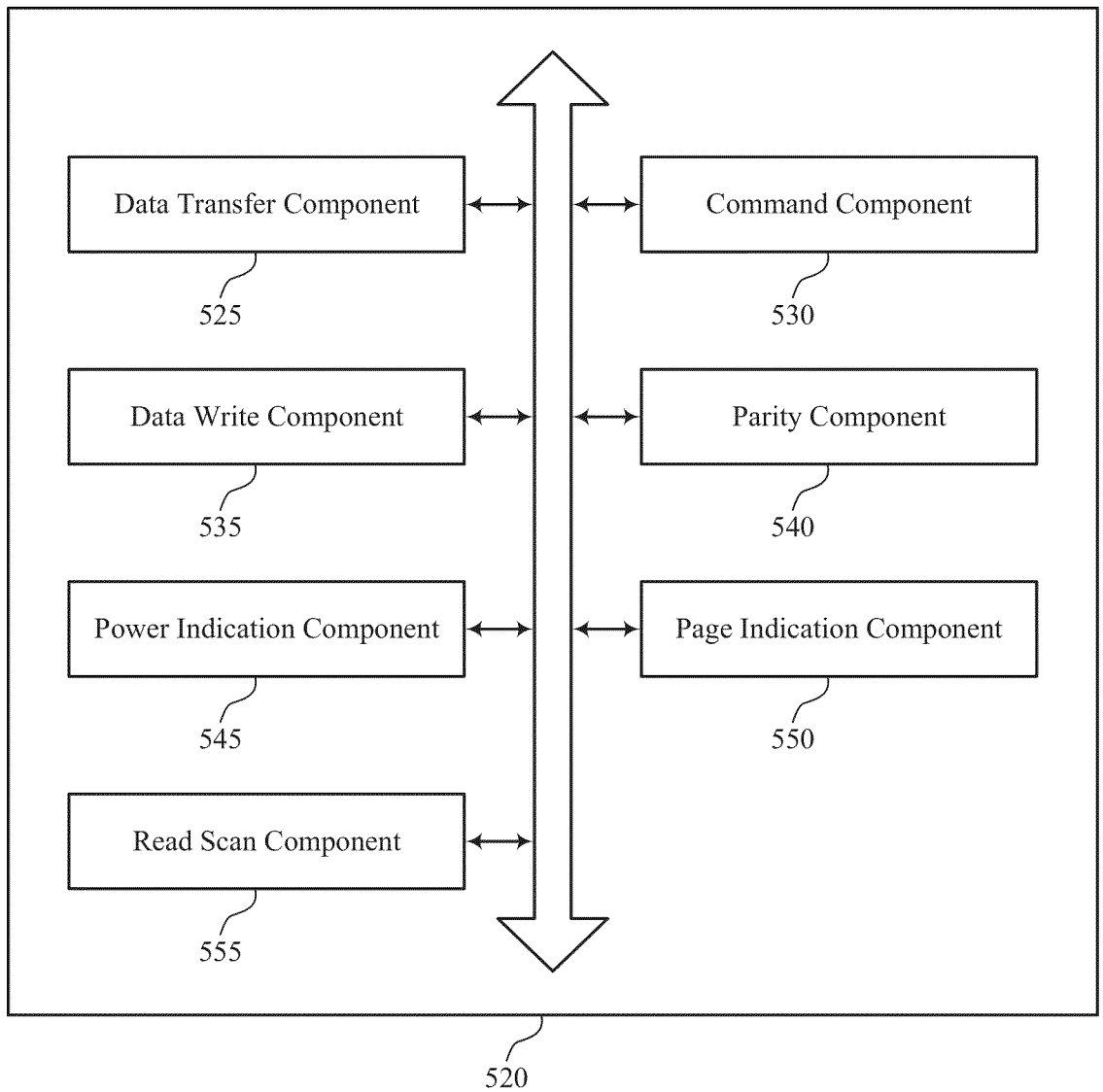
FIG. 5 illustrates a block diagram of a memory system that supports techniques for improving host write performance during data folding in accordance with examples as disclosed herein.

FIG. 5 illustrates a block diagram 500 of a memory system 520 that supports techniques for improving host write performance during data folding in accordance with examples as disclosed herein. The memory system 520 may be an example of aspects of a memory system as described with reference to FIGS. 1 through 4. The memory system 520, or various components thereof, may be an example of means for performing various aspects of techniques for improving host write performance during data folding as described herein. For example, the memory system 520 may include a data transfer component 525, a command component 530, a data write component 535, a parity component 540, a power indication component 545, a page indication component 550, a read scan component 555, or any combination thereof. Each of these components may communicate, directly or indirectly, with one another (e.g., via one or more buses).

The data transfer component 525 may be configured as or otherwise support a means for determining to transfer first data from one or more source data blocks of a memory system to one or more destination data blocks of the memory system, where the one or more source data blocks and the one or more destination data blocks are associated with one or more memory dies of a set of memory dies of the memory system. The command component 530 may be configured as or otherwise support a means for receiving, from a host system, a command to write second data to a first memory die of the one or more memory dies. The data write component 535 may be configured as or otherwise support a means for writing, concurrent with transferring the first data, the second data to a second memory die of the set of memory dies different than the one or more memory dies associated with the transfer of the first data based at least in part on the transfer of the first data being associated with the first memory die.

In some examples, the command component 530 may be configured as or otherwise support a means for allocating a portion of a volatile memory device of the memory system for receiving one or more commands including the command to write the second data, where writing the second data to the second memory die of the set of memory dies is based at least in part on the allocation of the portion of the volatile memory device for receiving the one or more commands.

In some examples, the data transfer component 525 may be configured as or otherwise support a means for transferring, after transferring the first data, the second data from one or more second source data blocks associated with the second memory die to one or more second destination data blocks of the memory system.

In some examples, a first order according to which the second data is transferred to the one or more second destination data blocks is associated with a second order of a sequential read of the second data from the one or more second destination data blocks.

In some examples, to support writing the second data, the data write component 535 may be configured as or otherwise support a means for writing the second data to the second memory die concurrent with transferring the first data based at least in part on a quantity of available source data blocks of the memory system failing to satisfy a threshold quantity.

In some examples, the data transfer component 525 may be configured as or otherwise support a means for determining to transfer third data from the one or more source data blocks to the one or more destination data blocks. In some examples, the command component 530 may be configured as or otherwise support a means for receiving, from the host system, a second command to write fourth data to the first memory die of the set of memory dies. In some examples, the data transfer component 525 may be configured as or otherwise support a means for suspending the transfer of the third data based at least in part on a quantity of available source data blocks of the memory system satisfying a threshold. In some examples, the data write component 535 may be configured as or otherwise support a means for writing the fourth data to the first memory die of the set of memory dies based at least in part on suspending the transfer of the third data.

In some examples, the command component 530 may be configured as or otherwise support a means for receiving, from the host system, a third command to write third data to the first memory die. In some examples, the data write component 535 may be configured as or otherwise support a means for writing the third data to the first memory die of the set of memory dies based at least in part on a completion of the transfer of the first data.

In some examples, the parity component 540 may be configured as or otherwise support a means for generating first parity data associated with the second data based at least in part on writing the second data to one or more pages of a pageline of the set of memory dies, the one or more pages being associated with the second memory die. In some examples, the data write component 535 may be configured as or otherwise support a means for writing, after transferring the first data, third data to one or more remaining pages of the pageline based at least in part on receiving one or more additional commands from the host system, the one or more remaining pages being associated with the one or more memory dies. In some examples, the parity component 540 may be configured as or otherwise support a means for generating second parity data associated with the third data based at least in part on writing the third data to the one or more remaining pages of the pageline. In some examples, the parity component 540 may be configured as or otherwise support a means for generating third parity data associated with the pageline based at least in part on the first parity data and the second parity data.

In some examples, the parity component 540 may be configured as or otherwise support a means for storing the first parity data to one or more retention data blocks of the memory system, where generating the third parity data is based at least in part on the storing.

In some examples, the parity component 540 may be configured as or otherwise support a means for reading, after transferring the first data, the second data from the one or more pages of the pageline, where generating the first parity data is based at least in part on reading the second data.

In some examples, the power indication component 545 may be configured as or otherwise support a means for receiving, from the host system, an indication of a power-off of the memory system. In some examples, the parity component 540 may be configured as or otherwise support a means for storing the first parity data to the second memory die based at least in part on the indication. In some examples, the parity component 540 may be configured as or otherwise support a means for reading, after a power-on of the memory system, the first parity data, where generating the third parity data is based at least in part on the reading the first parity data.

In some examples, the third parity data includes RAIN parity data.

In some examples, the power indication component 545 may be configured as or otherwise support a means for receiving, from the host system, an indication of a power-off of the memory system. In some examples, the page indication component 550 may be configured as or otherwise support a means for storing, before the power-off of the memory system, an indication of a respective last-written-to page of each memory die of the set of memory dies. In some examples, the page indication component 550 may be configured as or otherwise support a means for reading, based at least in part on a power-on of the memory system, the indication to determine the respective last-written-to page of each memory die. In some examples, the data write component 535 may be configured as or otherwise support a means for writing third data to a next page after a last-written-to page of one of the set of memory dies based at least in part on the reading.

In some examples, the read scan component 555 may be configured as or otherwise support a means for performing, based at least in part on a power-off of the memory system, a read scan to determine a respective last-written-to page of each memory die of the set of memory dies. In some examples, the data write component 535 may be configured as or otherwise support a means for writing third data to a next page after a last-written-to page of one of the set of memory dies based at least in part on the performing the read scan.

In some examples, the one or more source data blocks include SLCs, MLCs, TLCs, or any combination thereof, and the one or more destination data blocks include QLCs.

Figure 6:
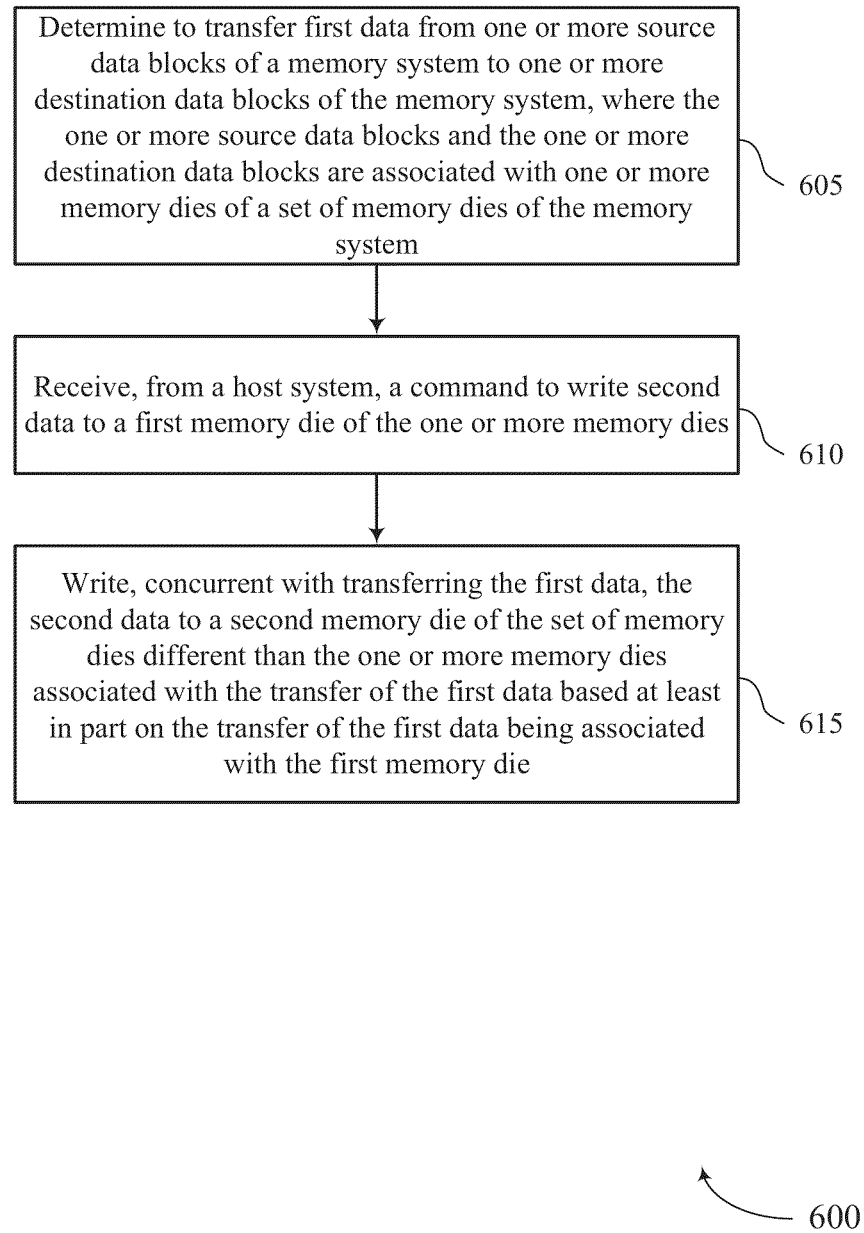
FIG. 6 illustrates a flowchart showing a method or methods that support techniques for improving host write performance during data folding in accordance with examples as disclosed herein.

FIG. 6 illustrates a flowchart showing a method 600 that supports techniques for improving host write performance during data folding in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include determining to transfer first data from one or more source data blocks of a memory system to one or more destination data blocks of the memory system, where the one or more source data blocks and the one or more destination data blocks are associated with one or more memory dies of a set of memory dies of the memory system. The operations of 605 may be performed in accordance with examples as disclosed herein. In some examples, aspects of the operations of 605 may be performed by a data transfer component 525 as described with reference to FIG. 5.

At 610, the method may include receiving, from a host system, a command to write second data to a first memory die of the one or more memory dies. The operations of 610 may be performed in accordance with examples as disclosed herein. In some examples, aspects of the operations of 610 may be performed by a command component 530 as described with reference to FIG. 5.

At 615, the method may include writing, concurrent with transferring the first data, the second data to a second memory die of the set of memory dies different than the one or more memory dies associated with the transfer of the first data based at least in part on the transfer of the first data being associated with the first memory die. The operations of 615 may be performed in accordance with examples as disclosed herein. In some examples, aspects of the operations of 615 may be performed by a data write component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining to transfer first data from one or more source data blocks of a memory system to one or more destination data blocks of the memory system, where the one or more source data blocks and the one or more destination data blocks are associated with one or more memory dies of a set of memory dies of the memory system; receiving, from a host system, a command to write second data to a first memory die of the one or more memory dies; and writing, concurrent with transferring the first data, the second data to a second memory die of the set of memory dies different than the one or more memory dies associated with the transfer of the first data based at least in part on the transfer of the first data being associated with the first memory die.

Aspect 2: The method, apparatus, or non-transitory computer-readable medium of aspect 1, further including operations, features, circuitry, logic, means, or instructions, or any combination thereof for allocating a portion of a volatile memory device of the memory system for receiving one or more commands including the command to write the second data, where writing the second data to the second memory die of the set of memory dies is based at least in part on the allocation of the portion of the volatile memory device for receiving the one or more commands.

Aspect 3: The method, apparatus, or non-transitory computer-readable medium of any of aspects 1 through 2, further including operations, features, circuitry, logic, means, or instructions, or any combination thereof for transferring, after transferring the first data, the second data from one or more second source data blocks associated with the second memory die to one or more second destination data blocks of the memory system.

Aspect 4: The method, apparatus, or non-transitory computer-readable medium of aspect 3, where a first order according to which the second data is transferred to the one or more second destination data blocks is associated with a second order of a sequential read of the second data from the one or more second destination data blocks.

Aspect 5: The method, apparatus, or non-transitory computer-readable medium of any of aspects 1 through 4, where writing the second data includes operations, features, circuitry, logic, means, or instructions, or any combination thereof for writing the second data to the second memory die concurrent with transferring the first data based at least in part on a quantity of available source data blocks of the memory system failing to satisfy a threshold quantity.

Aspect 6: The method, apparatus, or non-transitory computer-readable medium of any of aspects 1 through 5, further including operations, features, circuitry, logic, means, or instructions, or any combination thereof for determining to transfer third data from the one or more source data blocks to the one or more destination data blocks; receiving, from the host system, a second command to write fourth data to the first memory die of the set of memory dies; suspending the transfer of the third data based at least in part on a quantity of available source data blocks of the memory system satisfying a threshold; and writing the fourth data to the first memory die of the set of memory dies based at least in part on suspending the transfer of the third data.

Aspect 7: The method, apparatus, or non-transitory computer-readable medium of any of aspects 1 through 6, further including operations, features, circuitry, logic, means, or instructions, or any combination thereof for receiving, from the host system, a third command to write third data to the first memory die and writing the third data to the first memory die of the set of memory dies based at least in part on a completion of the transfer of the first data.

Aspect 8: The method, apparatus, or non-transitory computer-readable medium of any of aspects 1 through 7, further including operations, features, circuitry, logic, means, or instructions, or any combination thereof for generating first parity data associated with the second data based at least in part on writing the second data to one or more pages of a pageline of the set of memory dies, the one or more pages being associated with the second memory die; writing, after transferring the first data, third data to one or more remaining pages of the pageline based at least in part on receiving one or more additional commands from the host system, the one or more remaining pages being associated with the one or more memory dies; generating second parity data associated with the third data based at least in part on writing the third data to the one or more remaining pages of the pageline; and generating third parity data associated with the pageline based at least in part on the first parity data and the second parity data.

Aspect 9: The method, apparatus, or non-transitory computer-readable medium of aspect 8, further including operations, features, circuitry, logic, means, or instructions, or any combination thereof for storing the first parity data to one or more retention data blocks of the memory system, where generating the third parity data is based at least in part on the storing.

Aspect 10: The method, apparatus, or non-transitory computer-readable medium of aspect 8, further including operations, features, circuitry, logic, means, or instructions, or any combination thereof for reading, after transferring the first data, the second data from the one or more pages of the pageline, where generating the first parity data is based at least in part on reading the second data.

Aspect 11: The method, apparatus, or non-transitory computer-readable medium of aspect 8, further including operations, features, circuitry, logic, means, or instructions, or any combination thereof for receiving, from the host system, an indication of a power-off of the memory system; storing the first parity data to the second memory die based at least in part on the indication; and reading, after a power-on of the memory system, the first parity data, where generating the third parity data is based at least in part on the reading the first parity data.

Aspect 12: The method, apparatus, or non-transitory computer-readable medium of any of aspects 8 through 11, where the third parity data includes RAIN parity data.

Aspect 13: The method, apparatus, or non-transitory computer-readable medium of any of aspects 1 through 12, further including operations, features, circuitry, logic, means, or instructions, or any combination thereof for receiving, from the host system, an indication of a power-off of the memory system; storing, before the power-off of the memory system, an indication of a respective last-written-to page of each memory die of the set of memory dies; reading, based at least in part on a power-on of the memory system, the indication to determine the respective last-written-to page of each memory die; and writing third data to a next page after a last-written-to page of one of the set of memory dies based at least in part on the reading.

Aspect 14: The method, apparatus, or non-transitory computer-readable medium of any of aspects 1 through 12, further including operations, features, circuitry, logic, means, or instructions, or any combination thereof for performing, based at least in part on a power-off of the memory system, a read scan to determine a respective last-written-to page of each memory die of the set of memory dies and writing third data to a next page after a last-written-to page of one of the set of memory dies based at least in part on the performing the read scan.

Aspect 15: The method, apparatus, or non-transitory computer-readable medium of any of aspects 1 through 14, where the one or more source data blocks include SLCs, MLCs, TLCs, or any combination thereof, and the one or more destination data blocks include QLCs.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device; and
a controller coupled with the memory device and configured to cause the apparatus to:
determine to transfer first data from one or more source data blocks of a memory system to one or more destination data blocks of the memory system, wherein the one or more source data blocks and the one or more destination data blocks are associated with one or more memory dies of a set of memory dies of the memory system;
receive, from a host system, a command to write second data to a first memory die of the one or more memory dies; and
write, concurrent with transferring the first data, the second data to a second memory die of the set of memory dies different than the one or more memory dies associated with the transfer of the first data based at least in part on the transfer of the first data being associated with the first memory die.

2. The apparatus of claim 1, wherein the controller is further configured to cause the apparatus to:
allocate a portion of a volatile memory device of the memory system for receiving one or more commands comprising the command to write the second data, wherein writing the second data to the second memory die of the set of memory dies is based at least in part on the allocation of the portion of the volatile memory device for receiving the one or more commands.

3. The apparatus of claim 1, wherein the controller is further configured to cause the apparatus to:
transfer, after transferring the first data, the second data from one or more second source data blocks associated with the second memory die to one or more second destination data blocks of the memory system.

4. The apparatus of claim 3, wherein a first order according to which the second data is transferred to the one or more second destination data blocks is associated with a second order of a sequential read of the second data from the one or more second destination data blocks.

5. The apparatus of claim 1, wherein writing the second data is configured to cause the apparatus to:
write the second data to the second memory die concurrent with transferring the first data based at least in part on a quantity of available source data blocks of the memory system failing to satisfy a threshold quantity.

6. The apparatus of claim 1, wherein the controller is further configured to cause the apparatus to:
 determine to transfer third data from the one or more source data blocks to the one or more destination data blocks;
 receive, from the host system, a second command to write fourth data to the first memory die of the set of memory dies;
 suspend the transfer of the third data based at least in part on a quantity of available source data blocks of the memory system satisfying a threshold; and
 write the fourth data to the first memory die of the set of memory dies based at least in part on suspending the transfer of the third data.

7. The apparatus of claim 1, wherein the controller is further configured to cause the apparatus to:
 receive, from the host system, a third command to write third data to the first memory die; and
 write the third data to the first memory die of the set of memory dies based at least in part on a completion of the transfer of the first data.

8. The apparatus of claim 1, wherein the controller is further configured to cause the apparatus to:
 generate first parity data associated with the second data based at least in part on writing the second data to one or more pages of a pageline of the set of memory dies, the one or more pages being associated with the second memory die;
 write, after transferring the first data, third data to one or more remaining pages of the pageline based at least in part on receiving one or more additional commands from the host system, the one or more remaining pages being associated with the one or more memory dies;
 generate second parity data associated with the third data based at least in part on writing the third data to the one or more remaining pages of the pageline; and
 generate third parity data associated with the pageline based at least in part on the first parity data and the second parity data.

9. The apparatus of claim 8, wherein the controller is further configured to cause the apparatus to:
 store the first parity data to one or more retention data blocks of the memory system, wherein generating the third parity data is based at least in part on the storing.

10. The apparatus of claim 8, wherein the controller is further configured to cause the apparatus to:
 read, after transferring the first data, the second data from the one or more pages of the pageline, wherein generating the first parity data is based at least in part on reading the second data.

11. The apparatus of claim 8, wherein the controller is further configured to cause the apparatus to:
 receive, from the host system, an indication of a power-off of the memory system;
 store the first parity data to the second memory die based at least in part on the indication; and
 read, after a power-on of the memory system, the first parity data, wherein generating the third parity data is based at least in part on the reading the first parity data.

12. The apparatus of claim 8, wherein:
 the third parity data comprises redundant array of independent not-and (NAND) parity data.

13. The apparatus of claim 1, wherein the controller is further configured to cause the apparatus to:
 receive, from the host system, an indication of a power-off of the memory system;
 store, before the power-off of the memory system, an indication of a respective last-written-to page of each memory die of the set of memory dies;
 read, based at least in part on a power-on of the memory system, the indication to determine the respective last-written-to page of each memory die; and
 write third data to a next page after a last-written-to page of one of the set of memory dies based at least in part on the reading.

14. The apparatus of claim 1, wherein the controller is further configured to cause the apparatus to:
 perform, based at least in part on a power-off of the memory system, a read scan to determine a respective last-written-to page of each memory die of the set of memory dies; and
 write third data to a next page after a last-written-to page of one of the set of memory dies based at least in part on the performing the read scan.

15. The apparatus of claim 1, wherein the one or more source data blocks comprise single-level cells, multi-level cells, tri-level cells, or any combination thereof, and the one or more destination data blocks comprise quad-level cells.

16. A non-transitory computer-readable medium storing code comprising instructions which, when executed by a processor of an electronic device, cause the electronic device to:
 determine to transfer first data from one or more source data blocks of a memory system to one or more destination data blocks of the memory system, wherein the one or more source data blocks and the one or more destination data blocks are associated with one or more memory dies of a set of memory dies of the memory system;
 receive, from a host system, a command to write second data to a first memory die of the one or more memory dies; and
 write, concurrent with transferring the first data, the second data to a second memory die of the set of memory dies different than the one or more memory dies associated with the transfer of the first data based at least in part on the transfer of the first data being associated with the first memory die.

17. The non-transitory computer-readable medium of claim 16, wherein the instructions, when executed by the processor of the electronic device, further cause the electronic device to:
 allocate a portion of a volatile memory device of the memory system for receiving one or more commands comprising the command to write the second data, wherein writing the second data to the second memory die of the set of memory dies is based at least in part on the allocation of the portion of the volatile memory device for receiving the one or more commands.

18. The non-transitory computer-readable medium of claim 16, when executed by the processor of the electronic device, further cause the electronic device to:
 determine to transfer third data from the one or more source data blocks to the one or more destination data blocks;
 receive, from the host system, a second command to write fourth data to the first memory die of the set of memory dies;
 suspend the transfer of the third data based at least in part on a quantity of available source data blocks of the memory system satisfying a threshold; and write the fourth data to the first memory die of the set of memory dies based at least in part on suspending the transfer of the third data.

19. A method, comprising:

determining to transfer first data from one or more source data blocks of a memory system to one or more destination data blocks of the memory system, wherein the one or more source data blocks and the one or more destination data blocks are associated with one or more memory dies of a set of memory dies of the memory system;

receiving, from a host system, a command to write second data to a first memory die of the one or more memory dies; and writing, concurrent with transferring the first data, the second data to a second memory die of the set of memory dies different than the one or more memory dies associated with the transfer of the first data based at least in part on the transfer of the first data being associated with the first memory die.

20. The method of claim 19, further comprising:

allocating a portion of a volatile memory device of the memory system for receiving one or more commands comprising the command to write the second data, wherein writing the second data to the second memory die of the set of memory dies is based at least in part on the allocation of the portion of the volatile memory device for receiving the one or more commands.

* * * * *